United States Patent [19]

Ewell

[11] Patent Number: 5,433,171

[45] Date of Patent: Jul. 18, 1995

[54] AUTOMATIC PET FOOD DISPENSER

[76] Inventor: Anthony S. Ewell, 120 Park Ave., 11th Floor, New York, N.Y. 10017

[21] Appl. No.: 231,739

[22] Filed: Apr. 25, 1994

[51] Int. Cl.6 .............................................. A01K 5/02
[52] U.S. Cl. ...................................... 119/51.5; 119/57
[58] Field of Search ................... 119/51.5, 51.11, 56.1, 119/57, 57.1, 81

[56] References Cited

U.S. PATENT DOCUMENTS

| | | |
|---|---|---|
| 2,791,984 | 5/1957 | Franklin . |
| 3,171,385 | 3/1965 | Decker et al. ................... 119/51.11 |
| 3,340,851 | 9/1967 | Frank et al. ..................... 119/56.1 X |
| 3,527,191 | 9/1970 | Kawecki ............................ 119/51.5 |
| 3,638,618 | 2/1972 | Strother ........................... 119/51.12 |
| 3,949,909 | 4/1976 | Sterner ................................ 222/199 |
| 4,069,793 | 1/1978 | Gower ............................. 119/51.13 |
| 4,182,273 | 1/1980 | Peterson ............................ 119/51.5 |
| 4,279,221 | 7/1981 | Arvizu ............................. 119/51.11 |
| 4,284,035 | 8/1981 | White .............................. 119/51.11 |
| 4,315,483 | 2/1982 | Scheidler ........................ 119/51.11 |
| 4,497,280 | 2/1985 | Sanstrom et al. ............... 119/56.1 X |
| 4,513,688 | 4/1985 | Fassauer ............................ 119/52 A |
| 4,722,300 | 2/1988 | Walker et al. .................... 119/51.11 |
| 4,735,171 | 4/1988 | Essex .............................. 119/51.5 X |
| 4,756,277 | 7/1988 | Peng ................................ 119/51.11 |
| 4,782,790 | 11/1988 | Batson ............................. 119/51.11 |

FOREIGN PATENT DOCUMENTS 3738156  10/1988  Germany .......................... 119/51.11

Primary Examiner—Robert P. Swiatek
Attorney, Agent, or Firm—David L. Baker; Rhodes & Ascolillo

[57] ABSTRACT

An automatic animal feeding apparatus having an exterior cabinet, a base member supporting the exterior cabinet, a water tank disposed within the exterior cabinet, and a food hopper disposed within the exterior cabinet and positioned adjacent to the water tank. A food bowl and a water bowl are positioned substantially on a top surface of the base member. In addition, there is a first pressure sensing mechanism for generating a first analog signal corresponding to the weight of the water bowl, and a second pressure sensing mechanism for generating a second analog signal corresponding to the weight of the food bowl.

16 Claims, 7 Drawing Sheets

FIG. 6
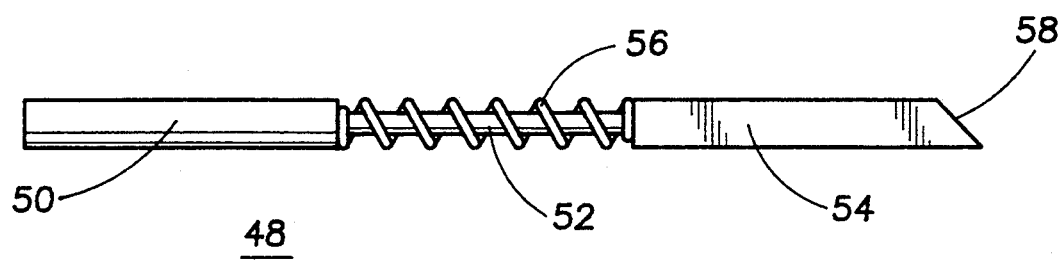
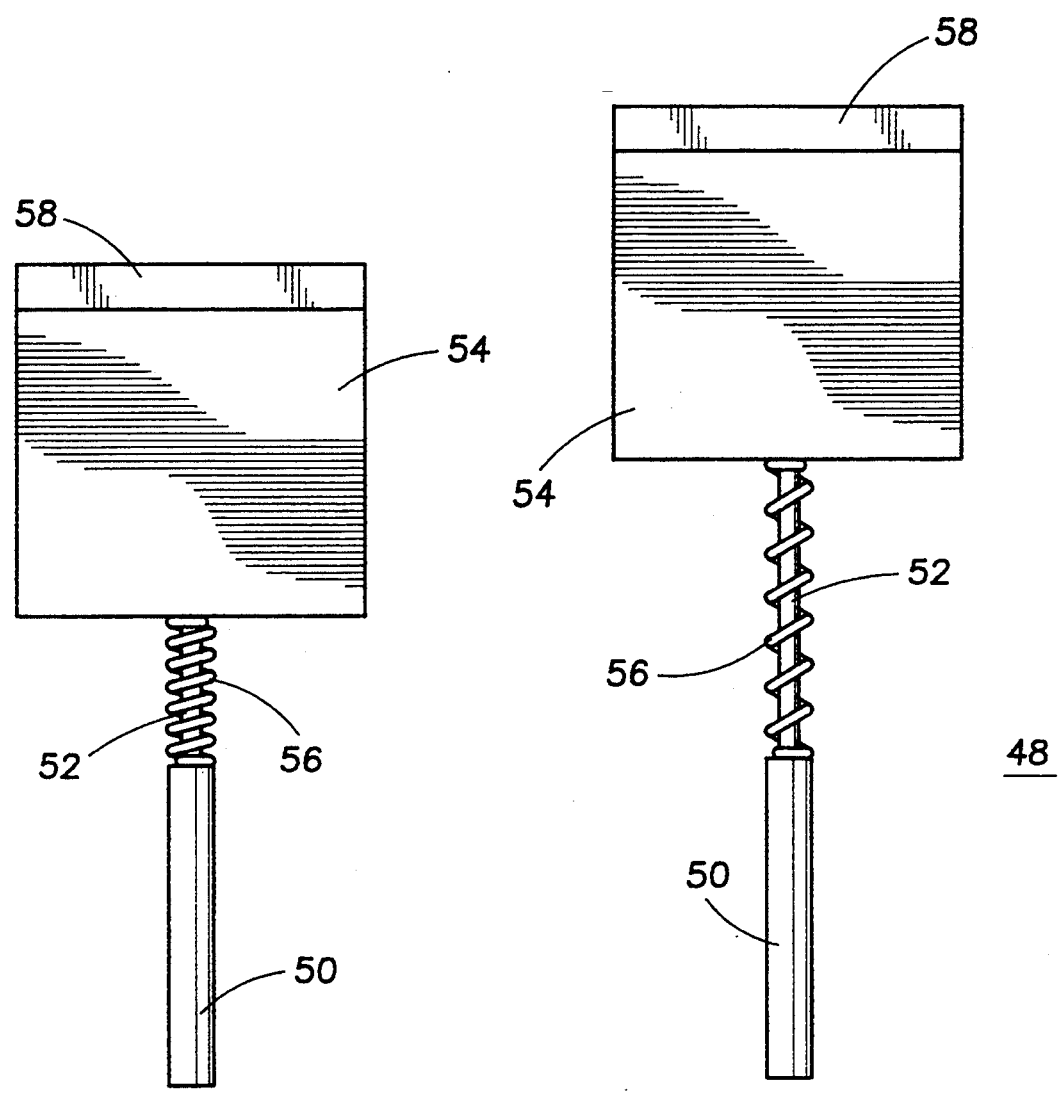
FIG. 7　　　　　FIG. 8

AUTOMATIC PET FOOD DISPENSER

BACKGROUND OF THE INVENTION

1. Field of the Invention

The present invention generally relates to a device for automatically feeding household pets and, more particularly but not by way of limitation, to such an apparatus having pressure sensitive mechanisms to determine when food and water bowls are to be automatically refilled.

2. Description of the Related Art

U.S. Pat. No. 4,315,483, issued to Scheidler, discloses an animal feeder which dispenses feed when less than a predetermined amount of food product is received by a trough, until the predetermined amount is again received by the trough. A control system is employed whereby the food trough, as it is filled with food product, forces a set of electrical contacts to come open, thus deenergizing a food dispensing circuit. When enough food is consumed by an animal, the trough springs force the trough upward to reclose the electrical contacts, activating a timer, and subsequently dispensing more food product.

U.S. Pat. No. 4,069,793, issued to Gower, discloses a pet feeding apparatus having a plurality of food containing tubes, each of which is opened at set intervals by a trap door held closed by a retractable plunger of an electrical relay. Upon receiving a signal from a timing circuit, the relay plunger is retracted, thus allowing the trap door to open by gravity and dispensing a predetermined amount of food. At the same time, a solenoid valve is opened for a fixed time interval to drain water from a water tank to mix with the pet food and to supply drinking water for the pet. This device, however, requires the user to manually reset the trap door and relay, as well as fill the food tubes each time food has been dispensed.

Other U.S. Patents of interest include the following: U.S. Pat. No. 2,791,984 issued to Franklin; U.S. Pat. No. 3,171,385 issued to Decker et. al.; U.S. Pat. No. 3,527,191 issued to Kawecki et. al.; U.S. Pat. No. 3,638,618 issued to Strother; U.S. Pat. No. 3,949,909 issued to Sterner; U.S. Pat. No. 4,182,273 issued to Peterson; U.S. Pat. No. 4,279,221 issued to Arvizu; U.S. Pat. No. 4,284,035 issued to White; U.S. Pat. No. 4,513,688 issued to Fassauer; U.S. Pat. No. 4,756,277 issued to Peng; U.S. Pat. No. 4,722,300 issued to Walker et. al.; and U.S. Pat. No. 4,782,790 issued to Batson.

SUMMARY OF THE INVENTION

There have been numerous devices designed in the past which provide for the automatic dispensing of food and water for animals, particularly household pets such as dogs and cats. Few of these devices, however, take advantage of modern solid state electronics, relying on relatively complex mechanical features for food and water distribution, as well as sensing empty and full conditions in the food and water receptacles. Moreover, none of the prior devices appear to have flexibility with regard to the predetermined amount of food and water to be dispensed. In other words, it may be necessary to have a device which dispenses a larger or smaller quantity of food, depending on the size of the animal to be fed. Thus, it is desirable for this device to have features which allow a user to preprogram the amounts of food and water to be dispensed.

Accordingly, it is a principal object of the present invention to provide a automatic pet food dispenser having electronically controlled food and water dispensing means.

It is another object of the present invention to provide the food and water dispensing means with solenoid operated actuators.

It is a further object of the present invention to provide the user with the capability to program desired empty and full values for the food and water bowls.

The present invention achieves the above objects, among others, by providing an automatic animal feeding apparatus having an exterior cabinet, a base member supporting the exterior cabinet, a water tank disposed within the exterior cabinet, and a food hopper disposed within the exterior cabinet and positioned adjacent to the water tank. A food bowl and a water bowl are positioned substantially on a top surface of the base member. In addition, there is a first pressure sensing mechanism for generating a first analog signal corresponding to the weight of the water bowl, and a second pressure sensing mechanism for generating a second analog signal corresponding to the weight of the food bowl. A water dispensing mechanism drains water from the water tank into the water bowl whenever the first pressure sensing mechanism indicates that the weight of the water bowl and associated water therein falls below a first lower threshold value. It stops the draining of water whenever the first pressure sensing mechanism indicates that the weight of the water bowl and associated water therein has risen above a first upper threshold value. Similarly, a food dispensing mechanism emptys food from the food hopper into the food bowl whenever the second pressure sensing mechanism indicates that the weight of the food bowl and associated food therein falls below a second lower threshold value. It stops the emptying of food whenever the second pressure sensing mechanism indicates that the weight of the food bowl and associated food therein has risen above a second upper threshold value. A microprocessor unit is located within the exterior cabinet for electronically controlling the food and water dispensing mechanisms. Finally, there is an analog to digital converting circuit located in the exterior cabinet which converts the first and second analog signals generated by the first and second pressure sensing mechanisms to digital signals. These digital signals are subsequently inputted to the microprocessor unit.

Preferably, the water dispensing means further includes a tubular conduit member, having a first end in fluid communication with a bottom surface of the water tank, extending downwardly and out of the exterior cabinet member, terminating a second end disposed directly above the water bowl. A solenoid operated valve is positioned inside the tubular conduit member between the first and second ends of the tubular conduit member. There is also a first transistor for energizing and deenergizing the solenoid operated valve, which has an input signal originating from a first output of the microprocessor unit. The solenoid operated valve, when energized, allows water from the water tank to flow downward through the tubular conduit member and into the water bowl.

The food dispensing mechanism further includes a solenoid operated door positioned over an opening in a bottom of the food hopper, a curved chute extending from an area of the exterior cabinet rearward of the opening in the bottom of the food hopper and extending substantially directly over the food bowl. There is a second transistor for energizing and deenergizing the solenoid operated door, which has an input signal originating from a second output of the microprocessor unit.

In addition, the solenoid operated door includes a coil portion, a plunger member slidably engaged within the coil portion, a substantially square shaped door member connected to one end of the plunger member, and a spring biasing mechanism for returning the door and plunger members to an extended position when the coil portion is in a deenergized state. The solenoid operated door is disposed in a substantially horizontal position such that when the coil portion is in an energized state, the door and plunger members slide to a retracted position, thereby allowing food from the food hopper to be dispensed by gravity. Also, the door member includes a tapered leading edge to dislodge any food particles trapped between the door member and the food hopper as the door member is returned to the extended position.

Each of the first and second pressure sensing mechanisms include a pressure transducer located inside the base member and a bearing surface connecting the pressure transducer to each of the food and water bowls.

BRIEF DESCRIPTION OF THE DRAWINGS

FIG. 6 is a side elevational view of the solenoid operated door which facilitates the dispensing of food;

FIG. 7 is a top view of the solenoid operated door of FIG. 6, shown in the retracted position;

FIG. 8 is another top view of the solenoid operated door of FIG. 6, shown in the extended position;

DESCRIPTION OF THE PREFERRED EMBODIMENT

Figure 1:
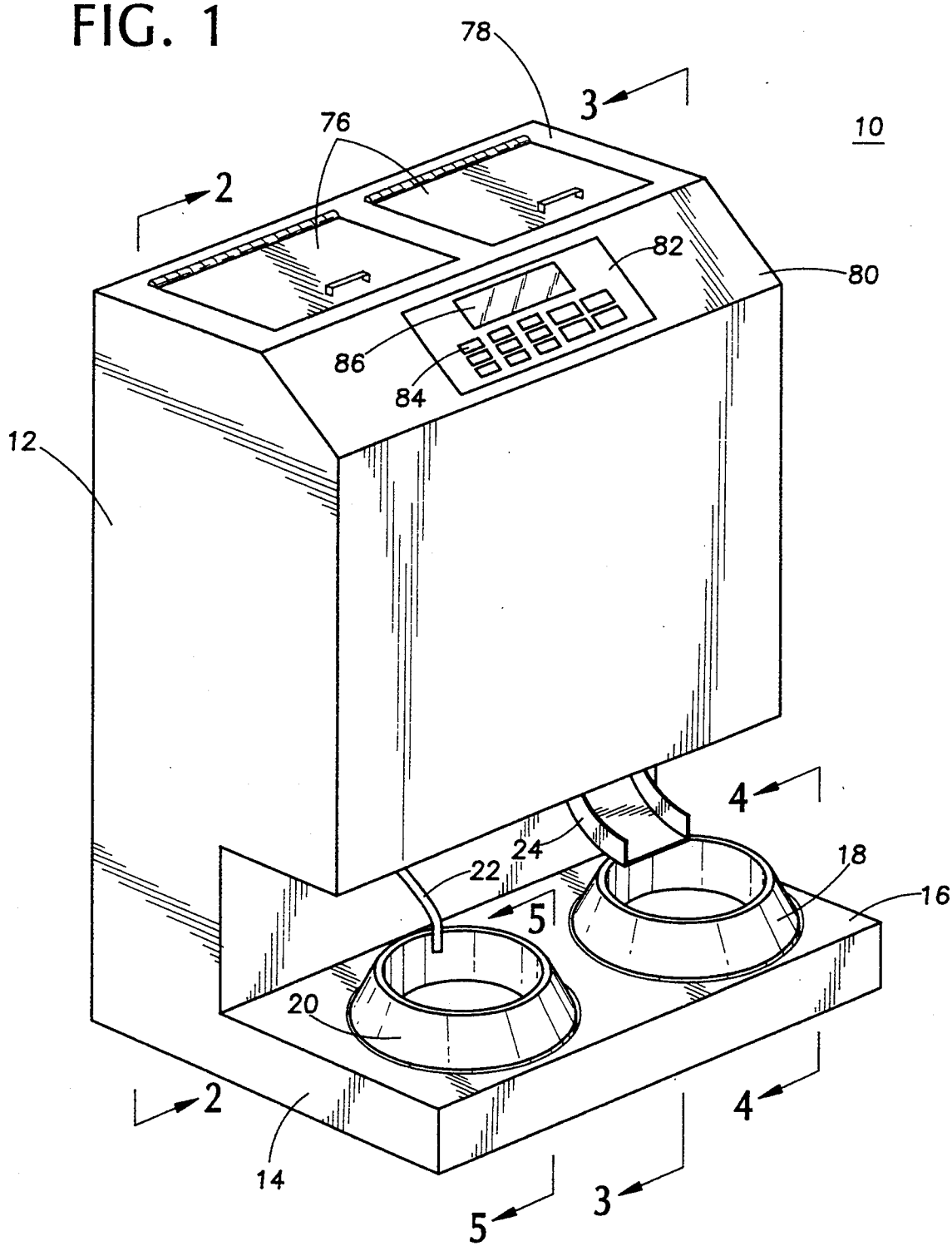
FIG. 1 is a perspective view of the automatic animal feeding apparatus according to the present invention.

Referring initially now to FIG. 1, there is shown an automatic animal feeding apparatus designated generally by the reference numeral 10. The apparatus 10 includes an exterior cabinet 12 which is supported by a generally flat, rectangular shaped base member 14. The exterior cabinet 12 may be made of plastic or any suitable lightweight metal. Positioned substantially on the top surface 16 of the base member 14 are a food bowl 18 and a water bowl 20. A downwardly projecting tubular conduit member 22 is shown over the water bowl 20 for supplying drinking water thereto. Likewise, a curved chute 24 is provided over the food bowl 18 to direct a dispensed amount of food therein.

Figure 2:
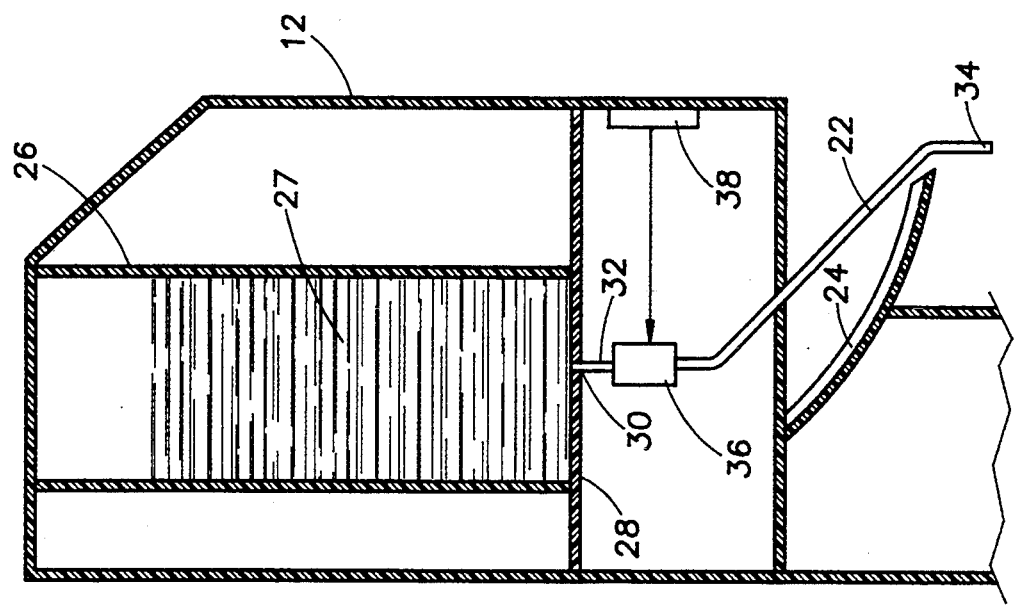
FIG. 2 is a partially sectional left side elevational view, taken along the line 2—2 of FIG. 1.

As best seen in FIG. 2, a water tank 26 having a supply of water 27 is vertically disposed within the exterior cabinet 12. The water tank 26 is preferably rectangular shaped, but may, in the alternative, have rounded walls. Located in the bottom surface 28 of the water tank 26 is a small opening 30 through which the tubular conduit member 22 is inserted, in order to place a first end 32 in fluid communication therewith. A path is therefore defined through which water 27 from the tank 26 may travel through the first end 32 of the conduit member 22, out of a second end 34 and into the water bowl 20. In order to regulate the flow of water 27 from the water tank 26, a solenoid operated valve 36 is positioned inside the conduit member 22 between the first and second ends 32 and 34. When deenergized, the valve 36 remains in a closed position, preventing the flow of water 27 from the tank 26 through the conduit 22 and into the water bowl 20. Once the valve 36 is energized via an electrical signal from a microprocessor unit 38 (the function of which is described in greater detail hereinafter), water 27 will freely flow from the tank 26 into the bowl 20.

Figure 3:
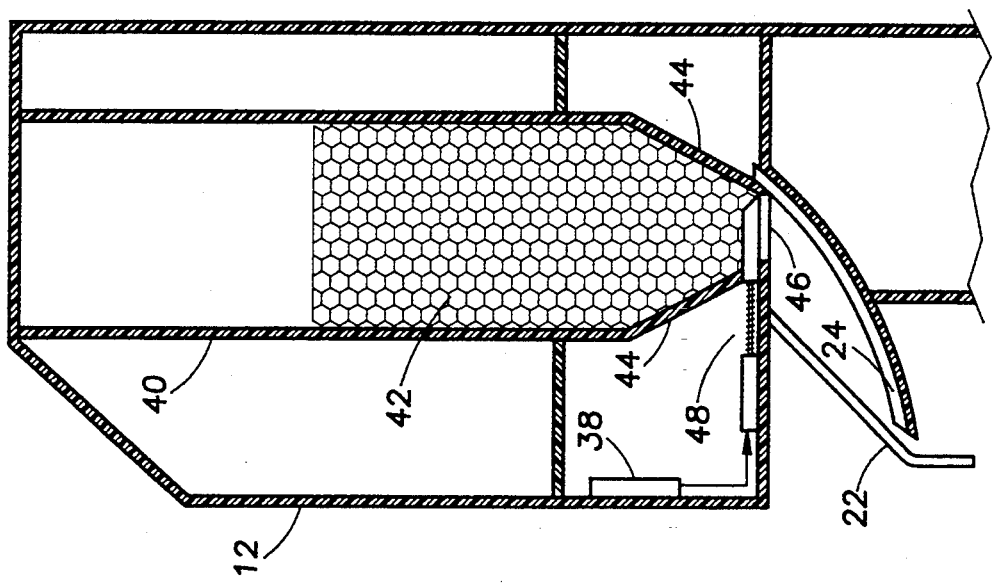
FIG. 3 is a partially sectional right side elevational view, taken along the line 3—3 of FIG. 1.

FIG. 3 illustrates a food hopper 40 containing a supply of food 42 therein, which is similar in construction and design to the water tank 12. The food hopper 40 is also generally rectangular in shape, having inwardly tapering sidewalls 44 which define a narrow aperture 46 at the bottom thereof. Covering the aperture 46 and keeping the food 42 contained inside the hopper 40 is a solenoid operated door 48. As seen in FIGS. 6-8, the solenoid operated door 48 consists of a coil portion 50 supplied by 12 VDC power, a plunger member 52 which is slidably engaged within the coil portion 50, a square shaped door member 54 connected to one end of the plunger member 52, and a biasing spring 56 disposed around the plunger member 52.

Once the coil portion 50 of the solenoid operated door 48 is energized, the plunger member 52 is drawn therein, causing the door member 54 to slide over the aperture 46 and the biasing spring 56 to be compressed. Food 42 then drops through the now open aperture 46, onto the curved chute 24 and into the food bowl 18. When the proper amount of food 42 has been dispensed, the coil portion 50 is deenergized, allowing the biasing spring 56 to return the door member 54 to its original position covering the aperture 46. It should be noted that the door member 54 includes a tapered leading edge 58 to dislodge any food 42 which may become trapped as the door member 54 is returned to the closed position.

Figure 4:
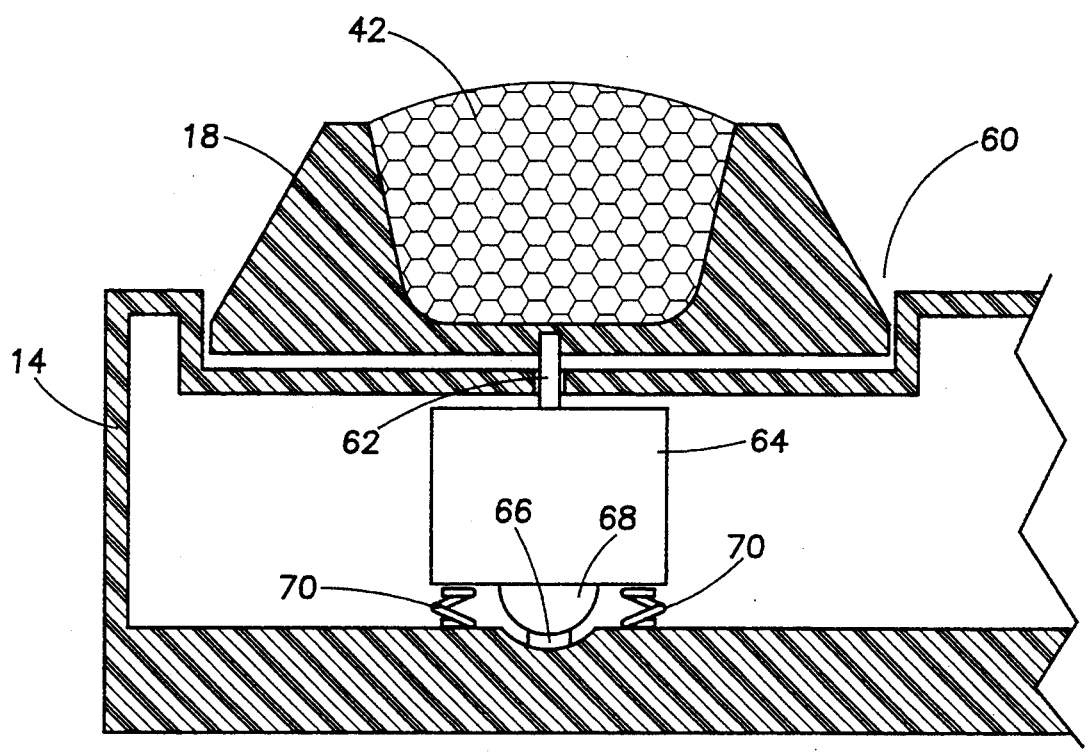
FIG. 4 is an enlarged sectional view, taken along the line 4—4 of FIG. 1, more particularly illustrating the food bowl pressure sensing and support mechanism.

Referring now to FIG. 4, the food bowl 18 is shown sitting within a first recess 60 in the base member 14. The bowl 18 is supported by the shaft 62 of an electric motor 64 located inside the base member 14. The motor 64 is used to rotate the food bowl 18 as food 42 is dispensed, providing a more uniform distribution of food therein. A pressure transducer 66 is located near the bottom of the base member 14, providing a variable electrical resistance in response to the weight of the food bowl 18, its contents, and the supporting structure. Physical contact is made with the pressure transducer 66 through a bearing surface 68 attached to the back of the motor 64. There are a plurality of mounting springs, as at 70, attached to the bottom of the base member 14 which help support the motor 64 and food bowl 18.

Figure 5:
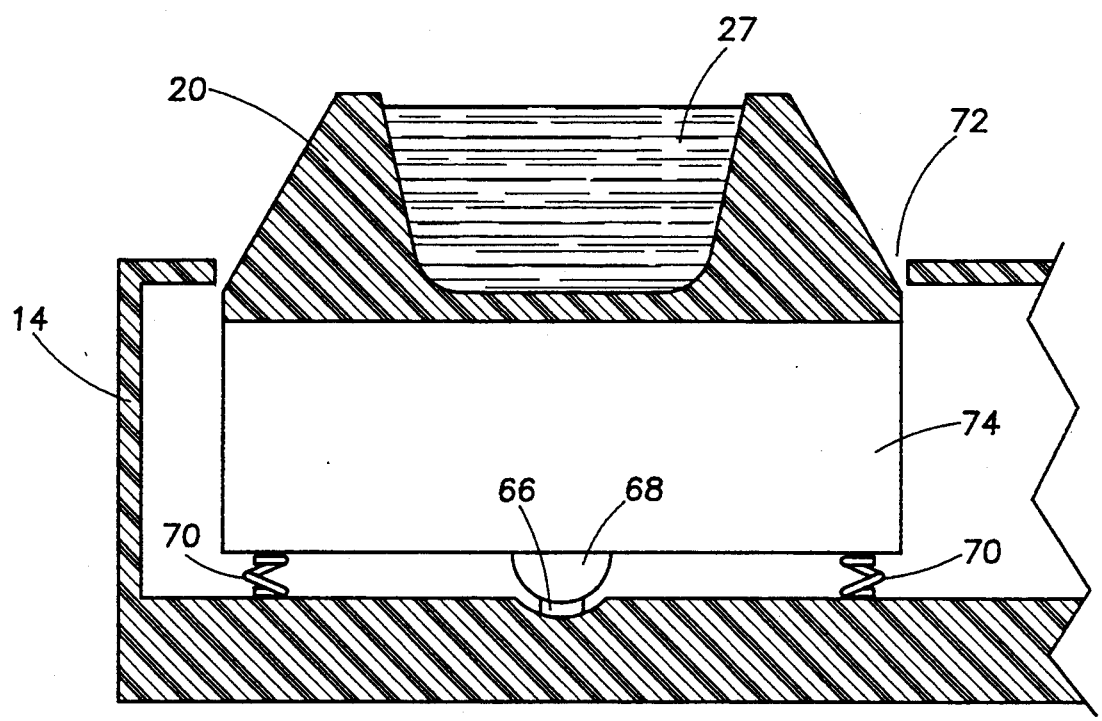
FIG. 5 is an enlarged sectional view, taken along the line 5—5 of FIG. 1, more particularly illustrating the water bowl pressure sensing and support mechanism.

In a similar fashion, the water bowl 20 sits within a second recess 72 in the base member 14, as illustrated in FIG. 5. As there is no need to rotate the water bowl 20, no motor is provided. Instead, the water bowl 20 is simply supported by a platform 74, but has the identical bearing surface 68 and mounting springs 70 of the food bowl assembly. Additionally, another pressure transducer 66 is used to sense the weight of the water bowl 20 and contents therein.

Finally, a pair of hinged doors 76 sit on the top surface 78 of the exterior cabinet 12, to provide access to both the water tank 26 and the food hopper 40. Located on a downwardly angled surface 80 of the exterior cabinet 12 and adjacent the top surface 78 is a keypad console 82 having a plurality of input keys 84 and a visual display 86, the function of which will be described hereinafter.

Figure 12:
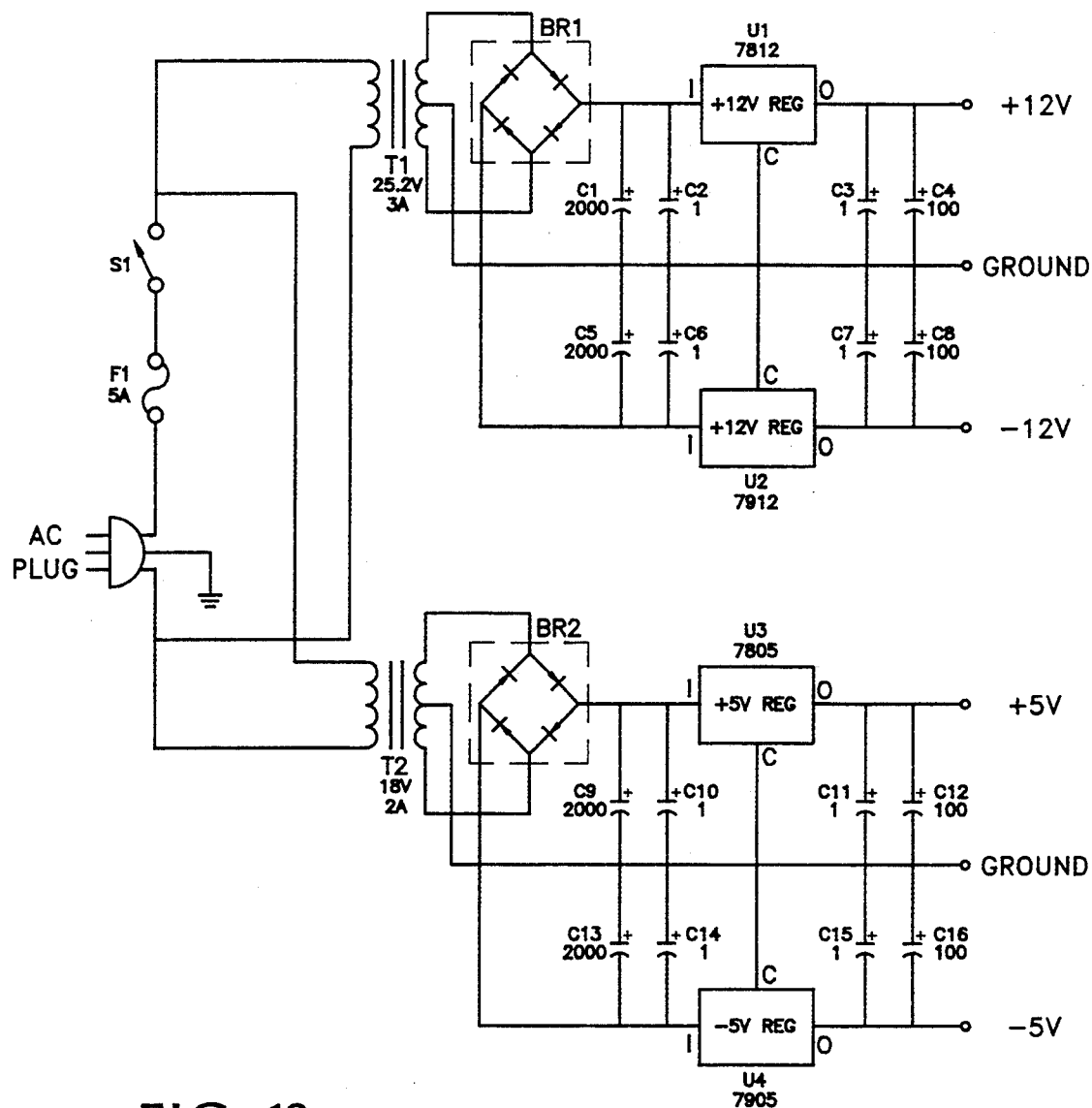
FIG. 12 is a schematic diagram of the power converters which may be used to supply 12 V and 5 V DC power for the present invention.

The necessary 12 VDC power for the motor 64, solenoid operated valve 36, and door 48 is furnished from a first AC/DC power converter, shown in FIG. 12, which includes step down transformer T1, along with bridge rectifier BR 1 and voltage regulators U1 and U2. The first power converter converts ordinary 115 VAC power to 12 VDC power. In addition, a second power converter converts 115 VAC power to the 5 VDC power necessary for the logic circuitry, including microprocessor unit 38. The second power converter, also shown in FIG. 12, includes step down transformer T2, bridge rectifier BR 2, and voltage regulators U3 and U4.

Figure 9:
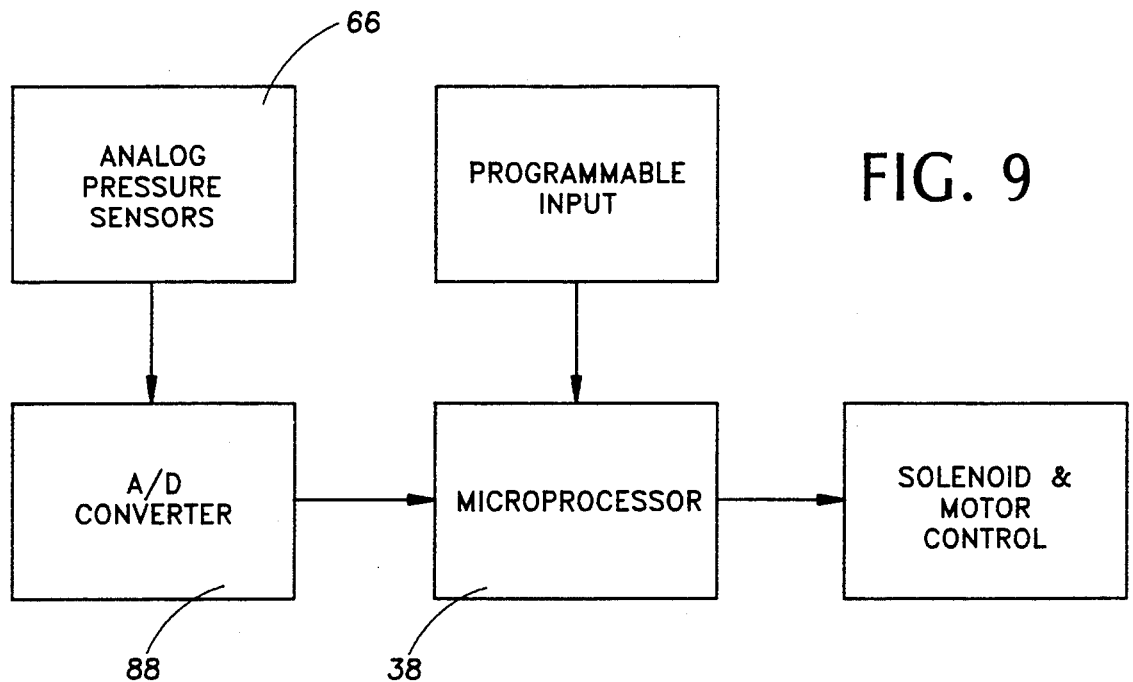
FIG. 9 is a block diagram relating the various control functions of the present invention.
Figure 10:
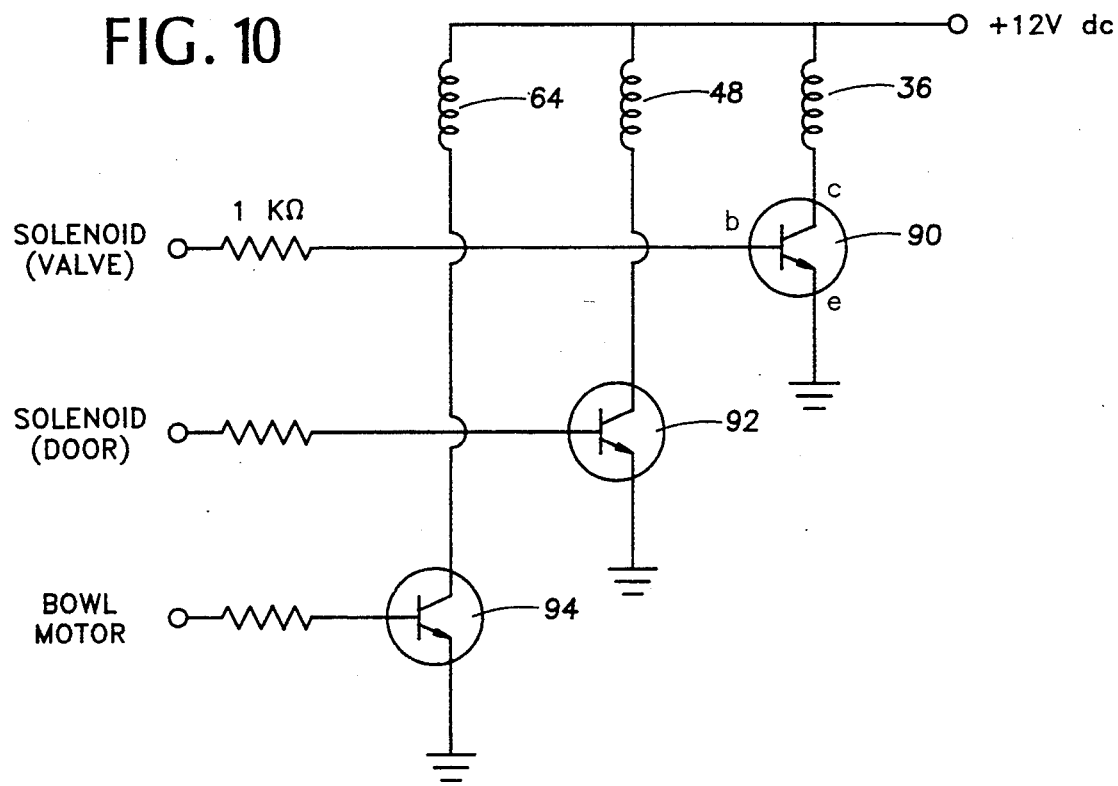
FIG. 10 is an electrical schematic of the switching transistors which energize the food bowl motor and solenoids.
Figure 11:
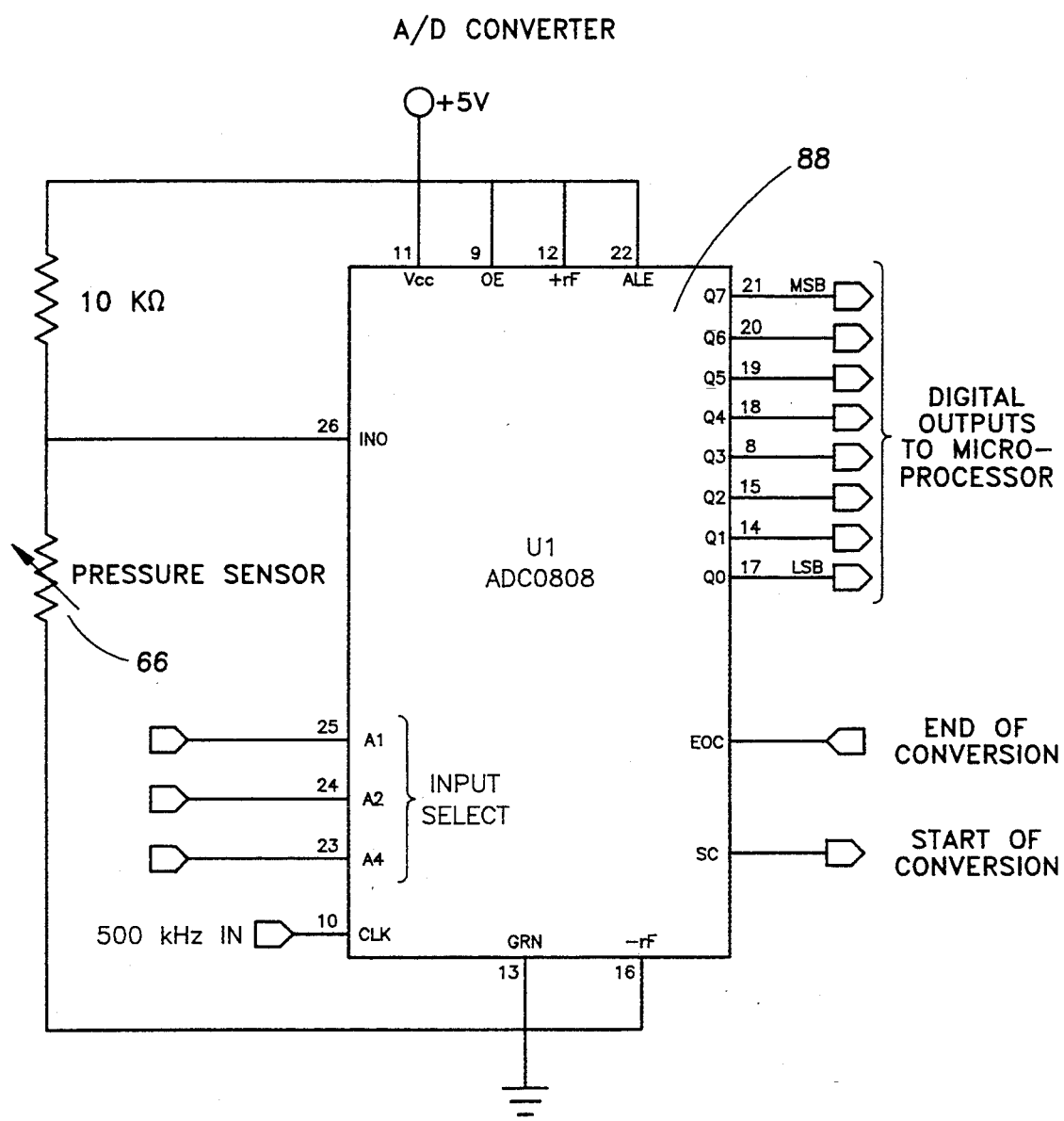
FIG. 11 is a schematic diagram of a typical analog to digital converter used in the present invention.

The overall control functions of the present invention are best understood by referring to the block diagram shown in FIG. 9. Readings from the analog pressure transducers 66 located under the food and water bowls are converted to digital values through an analog to digital converter 88, a type of which is illustrated in FIG. 11. These corresponding digital signals are sent to the microprocessor unit 38, where they are compared to values preprogrammed by the user. If it is determined, for example, that the weight of the water bowl 20 is less than a certain lower threshold value (signifying an empty bowl), the microprocessor unit 38 will send a signal to a switching transistor 90 connected to the solenoid operated valve 36, causing water 27 to fill the water bowl 20. As more water is added to the bowl, its weight increases, causing a corresponding change in the reading generated by the pressure transducer 66. Eventually, this value will increase to an upper threshold value (signifying a full bowl) stored in the microprocessor 38. At this point, the switching transistor 90 will be turned off, closing the valve 36.

This sequence applies to the food dispensing operation in the same manner. However, as food is being dispensed as a result of activating a second switching transistor 92, a third transistor 96 is simultaneously activated to provide a rotary motion on the food bowl 18 via the turning motor 64. The inventor believes this to be a superior method of attaining an even distribution of food product 42 within the food bowl 18.

Lastly, the user should be able to freely adjust the preprogrammed values corresponding to empty and full food and water bowls. One way to accomplish this could be as follows: a substantially empty food or water bowl is rested on the base member 14 and associated pressure transducer 66, producing an analog signal corresponding to its weight. By pressing one of the input keys 84 on the keypad console 82, this "empty" value can be stored by the microprocessor as the lower threshold value. Then, the user can fill the water or food bowl to a suitable level which he or she considers as "full" and place it back on the base member 14. This will, of course, register a higher weight value on the transducer 66. Once again, one of the input keys 84 is pressed, storing an upper threshold value in the microprocessor.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. An automatic animal feeding apparatus, comprising:
   an exterior cabinet;
   a base member supporting the exterior cabinet;
   a water tank disposed within the exterior cabinet;
   a food hopper disposed within the exterior cabinet and positioned adjacent to the water tank;
   a food bowl and a water bowl positioned substantially on a top surface of the base member;
   a first pressure sensing means for generating a first analog signal corresponding to the weight of the water bowl;
   a second pressure sensing means for generating a second analog signal corresponding to the weight of the food bowl;
   a water dispensing means for draining water from the water tank into the water bowl whenever the first pressure sensing means indicates that the weight of the water bowl and associated water therein falls below a first lower threshold value, said water dispensing means additionally stopping the draining of water whenever the first pressure sensing means indicates that the weight of the water bowl and associated water therein has risen above a first upper threshold value;
   a food dispensing means for emptying food from the food hopper into the food bowl whenever the second pressure sensing means indicates that the weight of the food bowl and associated food therein falls below a second lower threshold value, said food dispensing means additionally stopping the emptying of food whenever the second pressure sensing means indicates that the weight of the food bowl and associated food therein has risen above a second upper threshold value;
   a microprocessor unit located within the exterior cabinet for electronically controlling the food and water dispensing means; and
   an analog to digital converting circuit located in the exterior cabinet which converts the first and second analog signals generated by the first and second pressure sensing means to digital signals, with the digital signals subsequently being inputted to the microprocessor unit.

2. The automatic animal feeding apparatus as described in claim 1, wherein the water dispensing means further comprises:

a tubular conduit member, having a first end in fluid communication with a bottom surface of the water tank, the tubular conduit member extending downwardly and out of the exterior cabinet member, and having a second end disposed directly above the water bowl;

a solenoid operated valve positioned inside the tubular conduit member between the first and second ends of the tubular conduit member; and a first transistor means for energizing and deenergizing the solenoid operated valve, said transistor means having an input signal originating from a first output of the microprocessor unit;

whereby said solenoid operated valve, when energized, allows water from the water tank to flow downward through the tubular conduit member and into the water bowl.

3. The automatic animal feeding apparatus as described in claim 1, wherein the food dispensing means further comprises:

a solenoid operated door positioned over an opening in a bottom of the food hopper;

a curved chute extending from an area of the exterior cabinet rearward of the opening in the bottom of the food hopper and extending substantially directly over the food bowl; and a second transistor means for energizing and deenergizing the solenoid operated door, with the transistor means having an input signal originating from a second output of the microprocessor unit.

4. The automatic animal feeding apparatus as described in claim 3, wherein the solenoid operated door further comprises:

a coil portion;

a plunger member slidably engaged within the coil portion;

a substantially square shaped door member connected to one end of the plunger member; and a spring biasing means for returning the door and plunger members to an extended position when the coil portion is in a deenergized state;

the solenoid operated door being disposed in a substantially horizontal position such that when the coil portion is in an energized state, the door and plunger members slide to a retracted position, thereby allowing food from the food hopper to be dispensed by gravity.

5. The automatic animal feeding apparatus as described in claim 4, wherein the door member includes a tapered leading edge to dislodge any food particles trapped between the door member and the food hopper as the door member is returned to the extended position.

6. The automatic animal feeding apparatus as described in claim 1, wherein each of the first and second pressure sensing means further comprises:

a pressure transducer located inside the base member; and a bearing surface connecting the pressure transducer to each of the food and water bowls.

7. An automatic animal feeding apparatus, comprising:

an exterior cabinet;

a base member supporting the exterior cabinet;

a water tank disposed within the exterior cabinet;

a food hopper disposed within the exterior cabinet and positioned adjacent to the water tank;

a food bowl and a water bowl positioned substantially on a top surface of the base member;

a first pressure transducer located in the base member for generating a first analog signal corresponding to the weight of the water bowl;

a second pressure transducer located in the base member for generating a second analog signal corresponding to the weight of the food bowl;

a water dispensing means for draining water from the water tank into the water bowl whenever the first pressure sensing means indicates that the weight of the water bowl and associated water therein falls below a first lower threshold value, said water dispensing means additionally stopping the draining of water whenever the first pressure sensing means indicates that the weight of the water bowl and associated water therein has risen above a first upper threshold value;

a food dispensing means for emptying food from the food hopper into the food bowl whenever the second pressure sensing means indicates that the weight of the food bowl and associated food therein falls below a second lower threshold value, said food dispensing means additionally stopping the emptying of food whenever the second pressure sensing means indicates that the weight of the food bowl and associated food therein has risen above a second upper threshold value;

a microprocessor unit located within the exterior cabinet for electronically controlling the food and water dispensing means; and an analog to digital converting circuit located in the exterior cabinet which converts the first and second analog signals generated by the first and second pressure sensing means to digital signals, with the digital signals subsequently being inputted to the microprocessor unit.

8. The automatic animal feeding apparatus as described in claim 7, wherein the water dispensing means further comprises:

a tubular conduit member, having a first end in fluid communication with a bottom surface of the water tank, the tubular conduit member extending downwardly and out of the exterior cabinet member, and having a second end disposed directly above the water bowl;

a solenoid operated valve positioned inside the tubular conduit member between the first and second ends of the tubular conduit member; and a first transistor means for energizing and deenergizing the solenoid operated valve, said transistor means having an input signal originating from a first output of the microprocessor unit;

whereby said solenoid operated valve, when energized, allows water from the water tank to flow downward through the tubular conduit member and into the water bowl.

9. The automatic animal feeding apparatus as described in claim 8, wherein the food dispensing means further comprises a solenoid operated door positioned over an opening in the bottom of the food hopper, with the solenoid operated door having:

a coil portion;

a plunger member slidably engaged within the coil portion;

a substantially square shaped door member connected to one end of the plunger member; and a spring biasing means for returning the door and plunger members to an extended position when the coil portion is in a deenergized state;

the solenoid operated door being disposed in a substantially horizontal position such that when the coil portion is in an energized state, the door and plunger members slide to a retracted position, thereby allowing food from the food hopper to be dispensed by gravity.

10. The automatic animal feeding apparatus as described in claim 9, wherein the door member includes a tapered leading edge to dislodge any food particles trapped between the door member and the food hopper as the door member is returned to the extended position.

11. The automatic animal feeding apparatus as described in claim 10, additionally comprising a rotation means for turning the food bowl as food is being dispensed therein.

12. The automatic animal feeding apparatus as described in claim 11, wherein the rotation means comprises:
- an electric motor located in the base member;
- a drive shaft connecting the motor to the food bowl; and
- a switching transistor, having an output connected to the motor and an input connected to the microprocessor unit;
- the electric motor being simultaneously energized and deenergized along with the solenoid operated door;
- whereby food being dispensed in the food bowl is distributed in a relatively uniform fashion.

13. The automatic animal feeding apparatus as described in claim 12, wherein the exterior cabinet includes a pair of hinged doors on a top surface thereof to provide access to the food hopper and the water tank.

14. The automatic animal feeding apparatus as described in claim 13, further comprising:
- a first AC/DC power converter, having a input voltage of 115 VAC and an output voltage of 12 VDC, the 12 VDC output voltage being used to supply power to the electric motor, the solenoid operated Valve, and the solenoid operated door; and
- a second AC/DC power converter, having a input voltage of 115 VAC and an output voltage of 5 VDC, the 5 VDC output voltage being used to supply power to the microprocessor unit and associated logic circuitry.

15. The automatic animal feeding apparatus as described in claim 7, further comprising a programmable input means for adjustably setting the first and second lower threshold values and the first and second upper threshold values.

16. The automatic animal feeding apparatus as described in claim 15, wherein the programmable input means comprises:
- a keypad console located on an outside surface of the exterior cabinet, having a plurality of keys and a visual display associated therewith; and
- a means for electronically connecting the keypad console to the microprocessor unit.

* * * * *